United States Patent
Cheng

(10) Patent No.: US 6,481,790 B2
(45) Date of Patent: Nov. 19, 2002

(54) TRAY LOCK DEVICE

(76) Inventor: Kenny Cheng, No. 16, Lane 47, Chih Feng St., Taipei (TW)

( * ) Notice: Subject to any disclaimer, the term of this patent is extended or adjusted under 35 U.S.C. 154(b) by 87 days.

(21) Appl. No.: 09/745,357

(22) Filed: Dec. 21, 2000

(65) Prior Publication Data

US 2002/0079724 A1 Jun. 27, 2002

(51) Int. Cl.[7] .............................................. A47B 83/02
(52) U.S. Cl. ................. 297/153; 297/463.1; 297/463.2; 24/599.1; 24/647; 403/322.4
(58) Field of Search ............................. 297/153, 463.1, 297/463.2; 24/643, 647, 599.1, 488, 489; 403/321, 322.1, 322.4

(56) References Cited

U.S. PATENT DOCUMENTS

| | | | | |
|---|---|---|---|---|
| 3,328,078 A | * | 6/1967 | Whitley ................... | 297/153 X |
| 3,649,074 A | * | 3/1972 | McDonald et al. ......... | 297/130 |
| 5,037,154 A | * | 8/1991 | Senba et al. ................ | 296/37.1 |
| 5,971,103 A | * | 10/1999 | Mulvaney ................... | 182/129 |
| 6,301,757 B1 | * | 10/2001 | Kunii et al. .................. | 24/616 |

* cited by examiner

Primary Examiner—Anthony D. Barfield
(74) Attorney, Agent, or Firm—Harness, Dickey & Pierce, P.L.C.

(57) ABSTRACT

A tray lock, comprising comprises a main body 1 including an accommodating section 2 provided with a three fourths (¾) circular circumference edge extending in the end side of the main body 1, a rotary fastening means 3 connected with the main body 1 through a rivet 5 and a fastening hole 4 located between the accommodating section 2 and the main body 1, such that enables the rotary fastening means 3 to rotate with respect to the fastening hole 4 as a pivot.

2 Claims, 5 Drawing Sheets

TRAY LOCK DEVICE

BACKGROUND OF THE APPLICATION

A tray lock device is used for a baby car or a baby seat. In the conventional tray lock device it can be generally classified as two types. The first type referring to FIG. 1. is a simple connecting device, comprising connecting means A extending in the end of the tray lock device, provided with a semi-circular concave shape portion B for connecting it with a tubular support C of the baby car or the baby seat in such a manner to achieve the purpose of the fixation. The second type, referring to FIG. 2, is a tray lock device comprising pulling means 22 provided on the middle bottom section of the tray 21 for pulling a fastening means 23 provided in the front end of the extended tubular support 24, such that the front end of the tubular support 24 goes into a fastening hole 25 of a base portion 26 by pulling the pulling means 22, and while being in the fastening position of the fastening hole 25, the fastening means 23 connects with a fastening slot 27 of the fastening hole 25 for achieving the goal of the connection. For the disconnecting operation for the second type tray lock device, it requires pulling the pulling means 22 for enabling the fastening means 23 to depart from the fastening slot 27. These two tray lock devices both have their disadvantages. For the first type of the tray lock device, except for its convenience, it tends to have a bad connection effect for its simple connecting structure. As to the second type tray lock device, although it performs a better effect for the connection, since it is not easy to make sure whether or not the fastening means 23 with the fastening slot 27, the tray will have a risk of falling down as well as the complicated operation. Therefore, there is a requirement for the tray lock device to being setup easily and to connecting tightly without any risk.

SUMMARY OF THE APPLICATION

The present application is for overcoming the disadvantages of the prior two conventional tray lock devices, such that the tray lock device of the present application can be setup easily and connects tightly without any risk. In addition the merit of the present application also includes a capability of easily rotating, assembling disassembling. Further, the present application will prevent the tray from falling down from the fastening support during the rotation of the locking means. Also, the structure of the present application has an excellent capability for a static large weight.

DETAILED DESCRIPTION OF THE PREFERRED EMBODIMENT

The basic structure of the present application will be described here by referring to FIG. 3 to FIG. 5.

Figure 1:
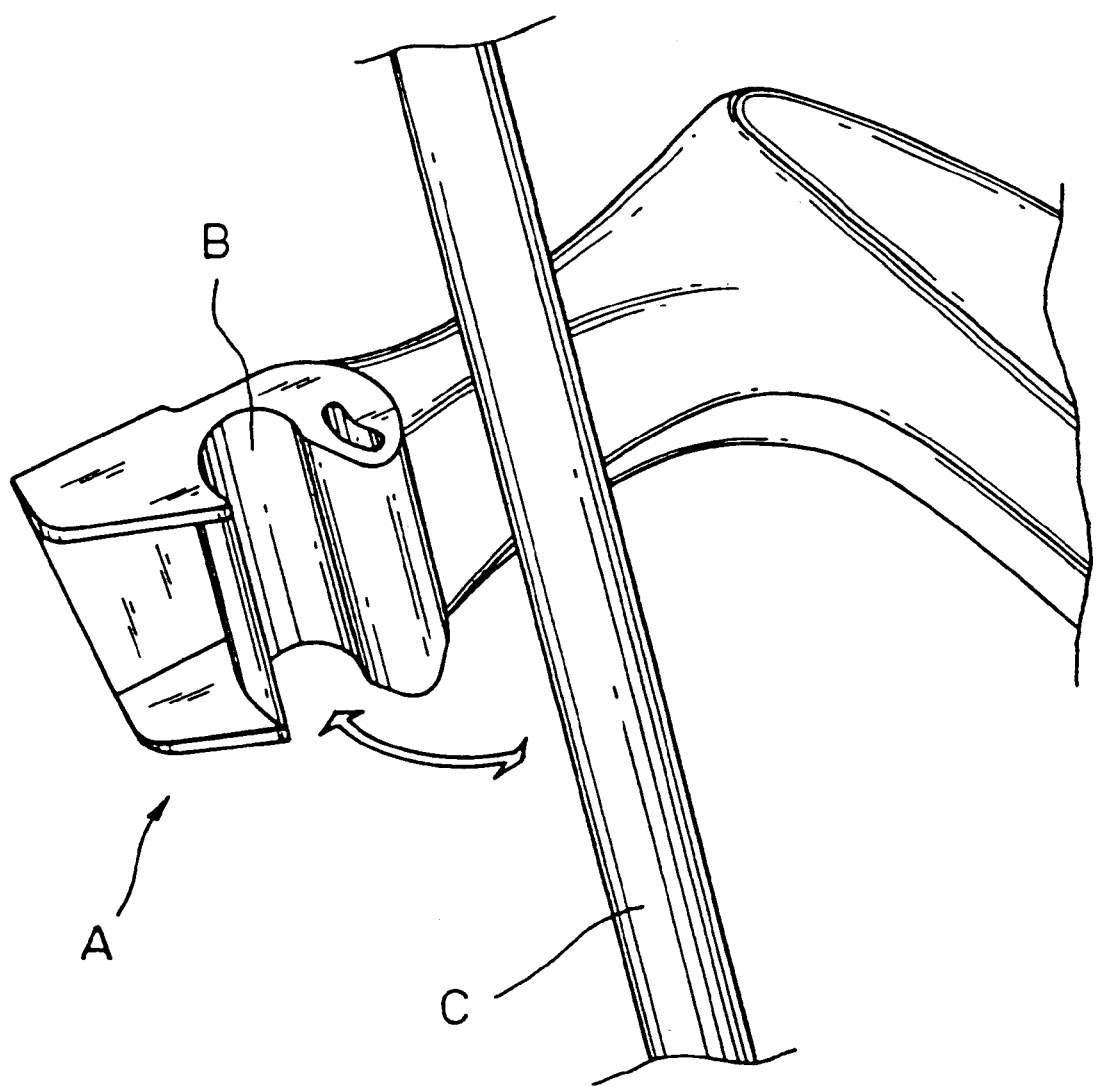
FIG. 1 is a perspective view showing a conventional tray lock with the simple connecting structure.
Figure 2:
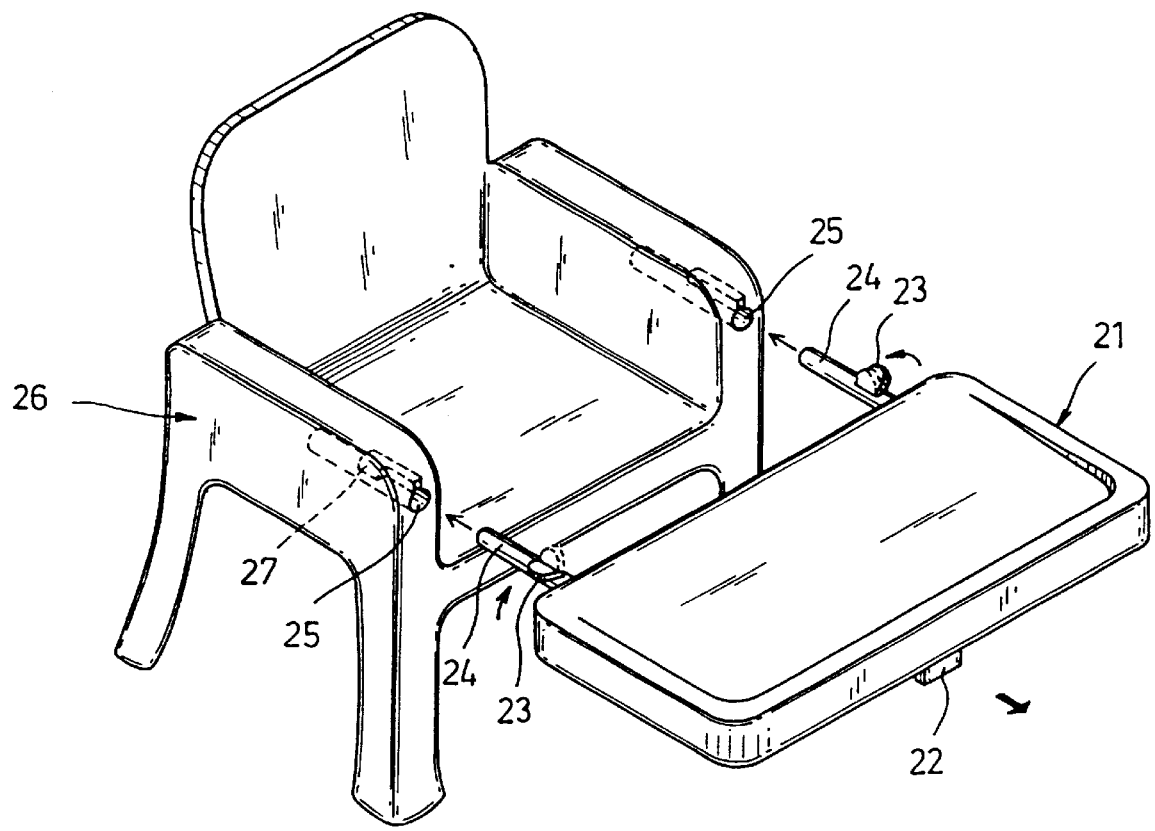
FIG. 2 is a perspective view showing a conventional tray lock device with a pulling means for moving the fastening means provided in the front end of the tubular support.
Figure 3:
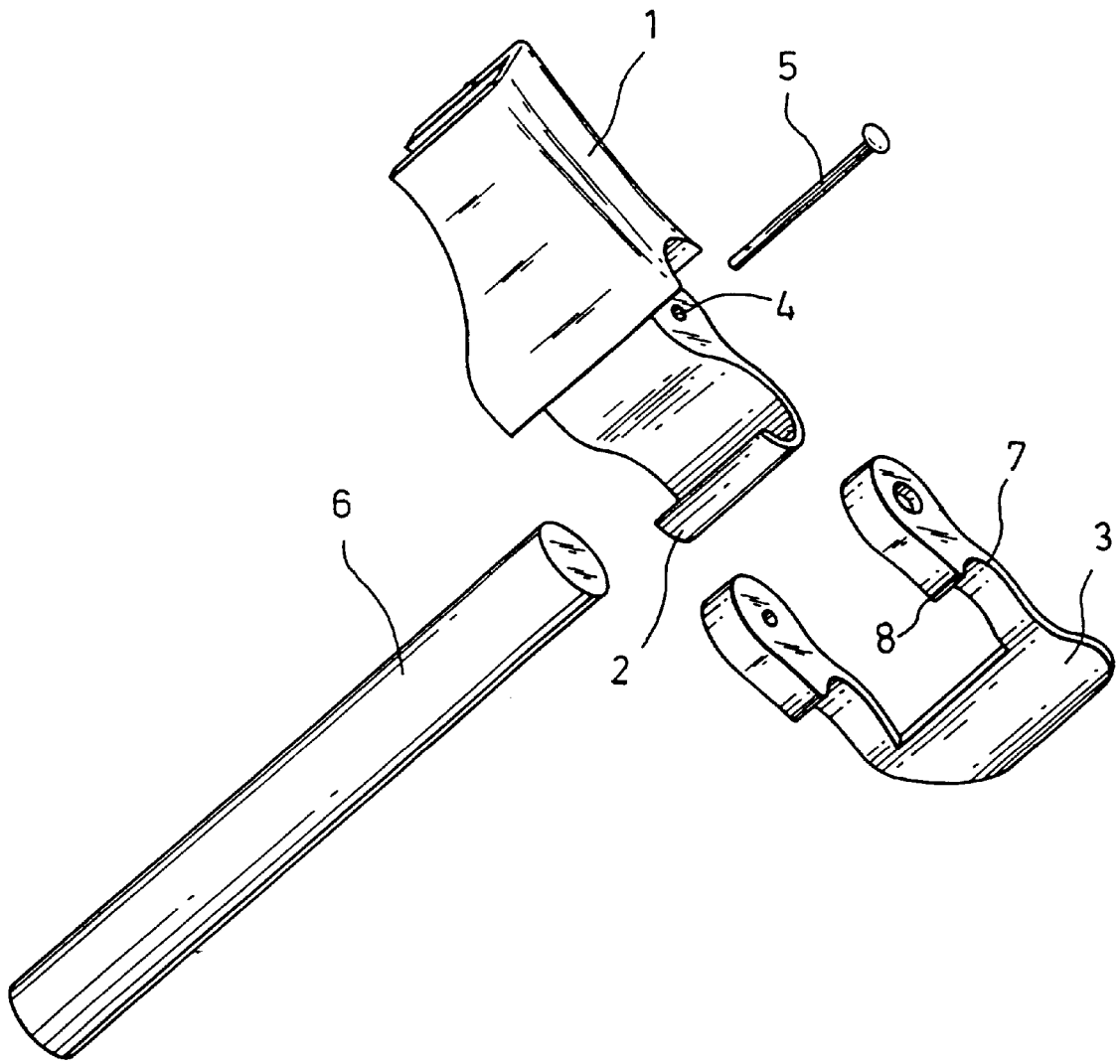
FIG. 3 is an exploded perspective view showing a tray lock device according to the present application.

Please referring to FIG. 3, it is an exploded perspective view showing a tray lock device according to the present application. The tray lock of the present application comprises a main body 1 including an accommodating section 2 provided with a three fourths (¾) circular circumference edge extending in the end side of the main body 1, a rotary fastening means 3 connected with the main body 1 through a rivet 5 and a fastening hole 4 located between the accommodating section 2 and the main body 1, such that enables the rotary fastening means 3 to rotate with respect to the fastening hole 4 as a pivot. With a semicircular size, an arc section 7 provided in a middle portion of the rotary fastening means 3 is assembled together with the accommodating section 2 to be a tangent circle. A flange portion 8 extending on the edge portion perpendicular to the surface of the arc section 7 in a side toward the fastening hole 4 is constructed together with the accommodating section 2 to form a connecting cylinder body with a seven eighths (⅞) circular circumference edge for fastening to a tubular support 6 tightly.

By the above structure, the tray lock device of the present application enables itself to tightly lock the tubular support 6 for a baby car or a bay seat.

Figure 4:
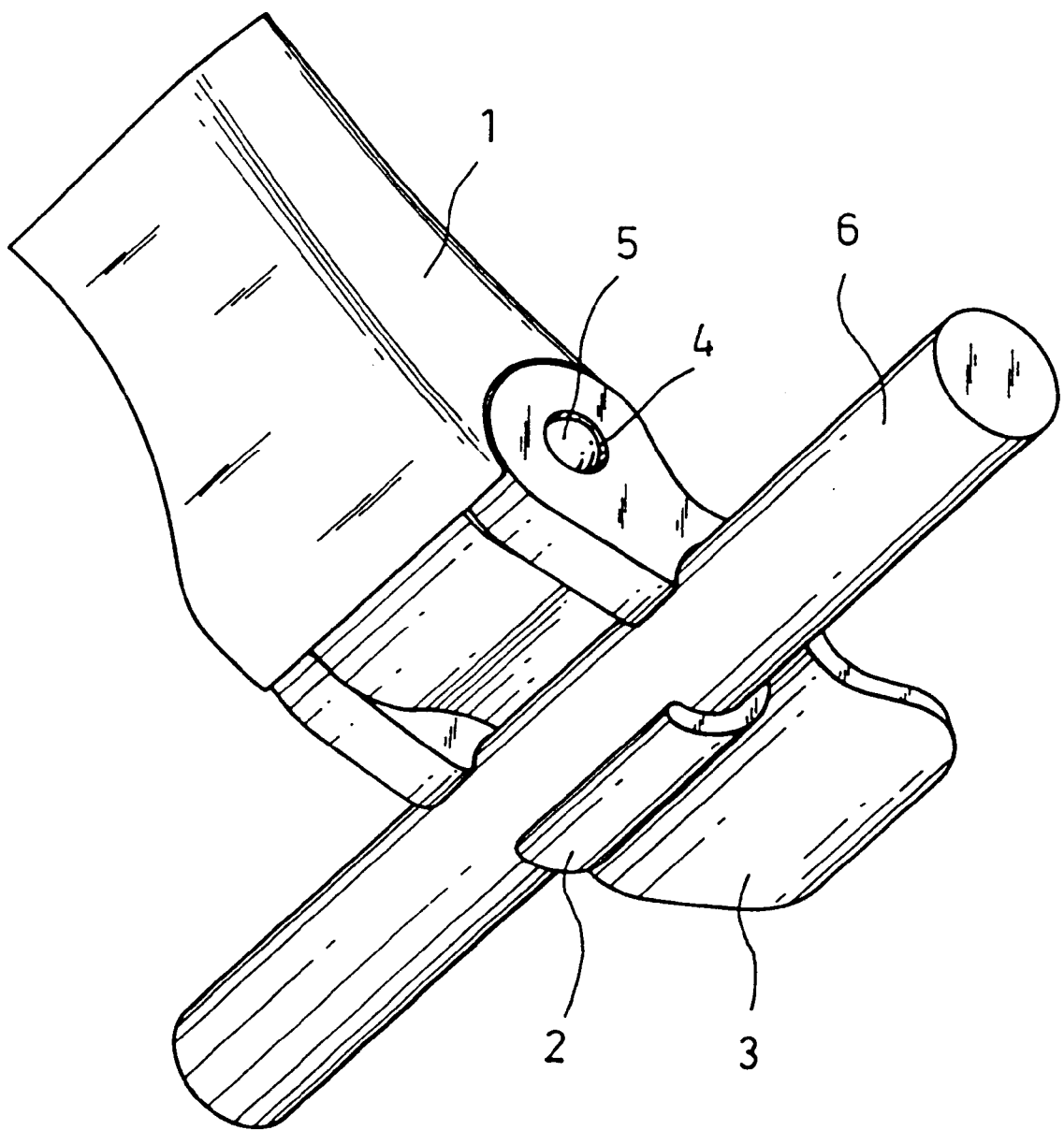
FIG. 4 is a perspective view showing a tray lock device according to the present application.

FIG. 4 is a perspective view showing a tray lock device according to the present application.

Figure 5:
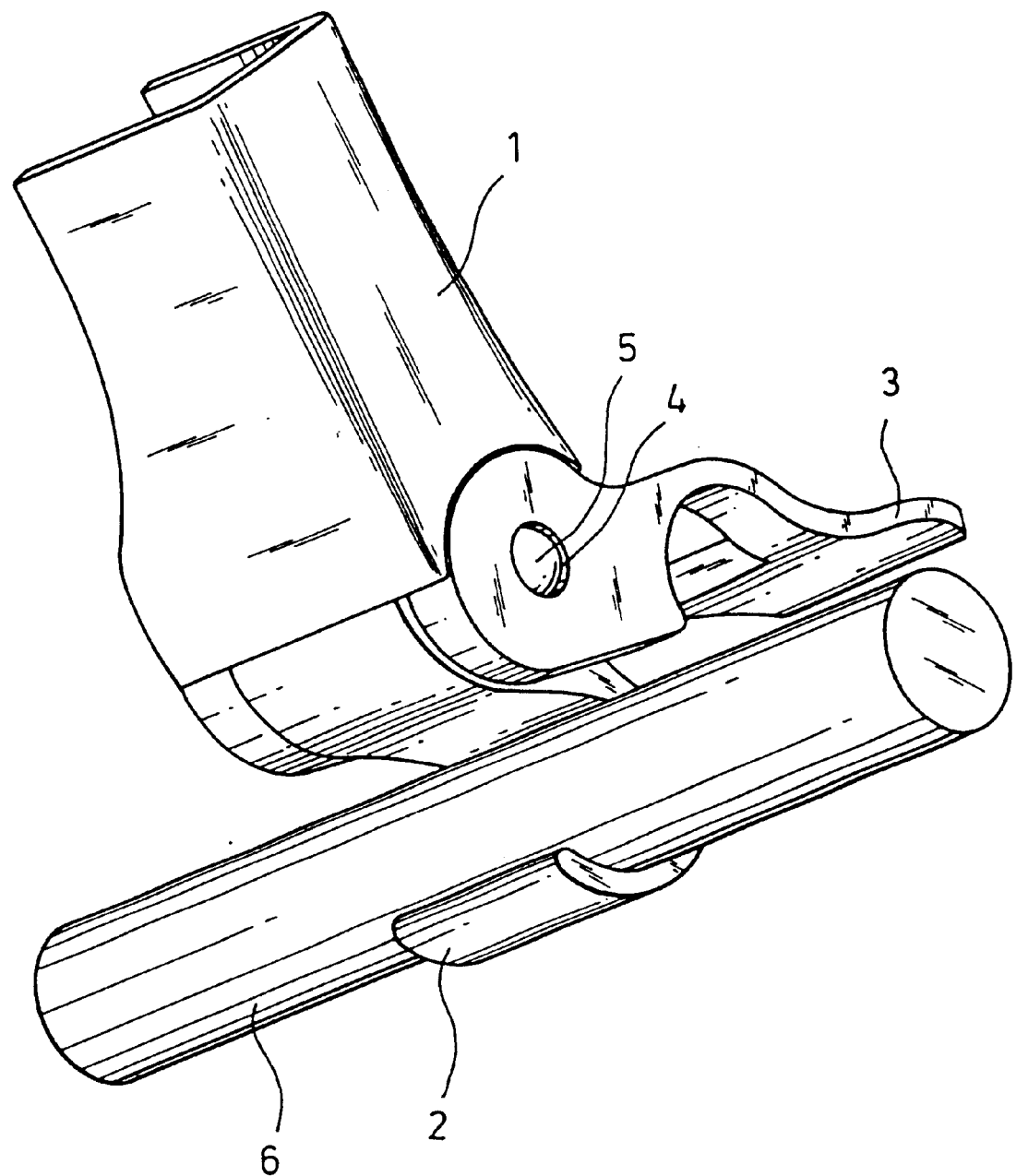
FIG. 5 is another perspective view showing a tray lock device according to the present application.

Referring to FIG. 5, the assembly and disassembly of the tray lock device for the present application will be described as follows.

FIG. 5 is a perspective view showing a tray lock device according to the present application. For the assembly, it is firstly preferable to rotate the rotary fastening means 3 toward a direction reverse to the opening side of the accommodating section 2, then secondly to assemble the tubular support 6 into the opening of the accommodating section 2, and lastly to rotate the fastening means 3 toward the opening side of the accommodating section 2 in such a manner that the flange portion 8 of the fastening means 3 connects with the tubular support 6 tightly for achieving the goal of tightly connection for the tray lock device of the present application.

As to the disassembly of the tray lock of the present application, it is preferable to rotate the rotary fastening means 3 to a direction reverse to the opening side of the accommodating section 2 for releasing the fastening means 3, then to separate the tubular support 6 from the opening of the accommodating section 2.

Please be noted that the size of the inner circumference of the accommodating section 2 is substantially equal to that of the outer circumference of the tubular support 6, such that it will have no gap space between the tray lock device and the tubular support.

The tray lock device of the present application has a merit of easily rotating, since the fastening means 3 and the main body 1 are connected via a rivet 5, and the arc of the fastening means 3 is rather similar to that of the tubular support 6 in size and the flange 8 is provided.

Since the structure of the present application comprises the flange portion 8 for assembling with the accommodating section 2 to form a connecting cylinder body with a seven eighths (⅞) circular circumference edge for fastening a tubular support 6 tightly, it prevents the tray lock from falling down while rotating the fastening means 3.

Since the structure of the present application is rather concrete, the static weighting capability is rather large which is excellent.

While an embodiment of the present application have been described above, it should be understood that they have been presented by way of example, but not limitation. It will be apparent to persons skilled in the relevant art that various changes in form and detail can be placed therein without departing from the spirit and scope of the application. Thus the present application should not be limited by the above example embodiment, but should be defined only in accordance with the following claims.

What is claimed is:

1. A tray lock, comprising:

a main body including:

a wide-shape accommodating section provided with a wide-shape three-fourths circular circumference hook, that is wide for closely contacting with and hooking a tubular support in a wide area, extending in the end side of the main body; and a fastening hole located between the accommodating section and the main body; and a rotary fastening means with two wide-shape semicircular arc sections and two wide-shape flange portions in a side toward the fastening hole, said rotary fastening means connected with the main body through a rivet and the fastening hole located between the accommodating section and the main body, such that enables the rotary fastening means to rotate with respect to the fastening hole as the pivot, wherein the semicircular arc sections are provided in a middle portion of the rotary fastening means as to assemble together with the accommodating section to be a tangent circle, the flange portions extending on the edge portion perpendicular to the surface of the arc section in a side toward the fastening hole as to construct together with the accommodating section to form a connecting cylinder body with a seven-eighths circular circumference edge for fastening to the tubular support tightly.

2. The tray lock of claim 1, wherein the size of the inner circumference of the accommodating section is substantially equal to that of the outer circumference of the tubular support, such that it will have no gap space between the tray lock device and the tubular support.

* * * * *